US012649631B2

(12) United States Patent
Bänteli et al.

(10) Patent No.: US 12,649,631 B2
(45) Date of Patent: *Jun. 9, 2026

(54) HANDLING DEVICE AND METHOD FOR DIVIDING A MAIN PRODUCT FLOW, IN PARTICULAR INTO AT LEAST TWO PRODUCT PARTIAL FLOWS

(71) Applicant: Syntegon Packaging Systems AG, Beringen (CH)

(72) Inventors: Linus Bänteli, Winterthur (CH); Michael Eder, Eggingen (DE); Markus Lattmann, Rickenbach Sulz (CH); Michael Rudolf, Beringen (CH); Ramun Seger, Beringen (CH); Yannik Simmler, Schaffhausen (CH); Raffael Wäspi, Hemishofen (CH); Jens Jakob Zorla, Feuerthalen (CH)

(73) Assignee: Syntegon Packaging Systems AG, Beringen (CH)

( * ) Notice: Subject to any disclaimer, the term of this patent is extended or adjusted under 35 U.S.C. 154(b) by 66 days.

This patent is subject to a terminal disclaimer.

(21) Appl. No.: 18/728,684

(22) PCT Filed: Jan. 13, 2023

(86) PCT No.: PCT/EP2023/050700

§ 371 (c)(1),
(2) Date: Jul. 12, 2024

(87) PCT Pub. No.: WO2023/135235

PCT Pub. Date: Jul. 20, 2023

(65) Prior Publication Data

US 2025/0058979 A1 Feb. 20, 2025

(30) Foreign Application Priority Data

Jan. 14, 2022 (DE) ..................... 10 2022 100 852.5

(51) Int. Cl.
| | |
|---|---|
| *B65G 47/71* | (2006.01) |
| *B65G 47/94* | (2006.01) |
| *B65G 11/20* | (2006.01) |

(52) U.S. Cl.
CPC .......... *B65G 47/71* (2013.01); *B65G 47/945* (2013.01); *B65G 11/203* (2013.01)

(58) Field of Classification Search
None
See application file for complete search history.

(56) References Cited

U.S. PATENT DOCUMENTS

| | | | |
|---|---|---|---|
| 343,999 A | 6/1886 | Lucas | |
| 1,114,935 A | * 10/1914 | Sutton et al. | ......... B07B 13/003 |
| | | | 209/692 |

(Continued)

FOREIGN PATENT DOCUMENTS

| | | | | |
|---|---|---|---|---|
| CN | 113697367 A | * 11/2021 | ............. | B65G 47/74 |
| DE | 2541813 A1 | 4/1976 | | |

(Continued)

OTHER PUBLICATIONS

International Preliminary Report on Patentability for Application No. PCT/EP2023/050700 dated Jun. 20, 2024 (17 pages including English machine translation).

(Continued)

*Primary Examiner* — Gene O Crawford
*Assistant Examiner* — Muhammad Awais
(74) *Attorney, Agent, or Firm* — Michael Best & Friedrich LLP

(57) ABSTRACT

A handling device for dividing a main product stream (12*a;* 12*b*) comprises at least one main stream transport unit (18*a;* 18*b*) which includes a main conveyor belt unit and by which the main product stream (12*a;* 12*b*) can be conveyed along a main conveying direction (20*a;* 20*b*) of the main stream (Continued)

transport unit (18a; 18b). At least one division conveying unit (22a; 22b), which is configured for dividing the main product stream (12a; 12b), includes at least one division conveying element (28a; 28b), which is movable along a division conveying direction (26a; 26b) of the division conveying unit (22a; 22b), running at least substantially perpendicularly to the main conveying direction (20a; 20b), and which includes a division conveyor belt and by which the main product stream (12a; 12b) can be divided.

11 Claims, 3 Drawing Sheets

(56) References Cited

U.S. PATENT DOCUMENTS

| | | | | |
|---|---|---|---|---|
| 1,292,820 | A | * | 1/1919 | Lindsley .............. B07B 13/003 |
| | | | | 209/692 |
| 4,054,199 | A | | 10/1977 | Polderman |
| 5,078,255 | A | * | 1/1992 | Haley ................. B65G 47/647 |
| | | | | 198/369.2 |
| 5,423,431 | A | * | 6/1995 | Westin ...................... B07C 5/02 |
| | | | | 209/539 |
| 5,588,534 | A | * | 12/1996 | Harel ........................ B03B 9/06 |
| | | | | 209/636 |
| 5,641,052 | A | * | 6/1997 | Lazzarotti .............. B65G 47/31 |
| | | | | 198/360 |
| 5,950,800 | A | * | 9/1999 | Terrell ............... B65G 47/1492 |
| | | | | 198/452 |
| 6,227,377 | B1 | | 5/2001 | Bonnet |
| 8,955,664 | B2 | * | 2/2015 | Lim ..................... B65G 47/648 |
| | | | | 198/370.1 |
| 9,517,896 | B2 | * | 12/2016 | Kimura .................. B65G 37/00 |
| 9,878,349 | B2 | * | 1/2018 | Crest .......................... B07C 1/06 |
| 10,994,948 | B1 | * | 5/2021 | Dwivedi ............... B65G 47/46 |
| 2001/0054540 | A1 | | 12/2001 | Steeber et al. |
| 2002/0157921 | A1 | | 10/2002 | Steeber et al. |
| 2003/0075416 | A1 | * | 4/2003 | Prutu ........................ B07C 5/34 |
| | | | | 198/370.1 |
| 2003/0111319 | A1 | | 6/2003 | Steeber et al. |
| 2009/0120764 | A1 | * | 5/2009 | Hysell ................. B65G 47/844 |
| | | | | 198/370.02 |

FOREIGN PATENT DOCUMENTS

| | | | |
|---|---|---|---|
| DE | 2508275 | A1 | 9/1976 |
| DE | 2516583 | A1 | 10/1976 |
| DE | 4412686 | A1 | 10/1995 |
| DE | 69918468 | T2 | 8/2005 |

OTHER PUBLICATIONS

United States Patent Office Non-Final Rejection for U.S. Appl. No. 18/728,693 dated Nov. 18, 2025 (11 pages).

* cited by examiner

HANDLING DEVICE AND METHOD FOR DIVIDING A MAIN PRODUCT FLOW, IN PARTICULAR INTO AT LEAST TWO PRODUCT PARTIAL FLOWS

CROSS-REFERENCE TO RELATED APPLICATIONS

This patent application is a U.S. national stage application of international patent application PCT/EP2023/050700, filed on Jan. 13, 2023, which is based on and claims priority to German patent application DE 10 2022 100 852.5, filed on Jan. 14, 2022, the contents of which are incorporated herein by reference.

BACKGROUND

The invention relates to a handling device for dividing a main product stream, in particular into at least two partial product streams, having at least one main stream transport unit, in particular a main conveyor belt unit, by means of which the main product stream can be conveyed along a main conveying direction of the main stream transport unit, and having at least one division conveying unit which is configured for dividing the main product stream, in particular by discharging products and/or by dividing the main product stream into at least two partial product streams, wherein the division conveying unit has at least one division conveying element, in particular a division conveyor belt, which is movable along a division conveying direction of the division conveying unit running transversely, in particular at least substantially perpendicularly, to the main conveying direction and by means of which the main product stream can be divided. In addition, the invention relates to a method for dividing a main product stream, in particular into at least two partial product streams, by means of the handling device.

Such handling devices and methods are already known from EP 2 019 803 B1 and FR 2 104 687 B1, in which a product stream of products from a main stream transport unit is divided into multiple partial product streams by means of division conveying units which can be pivoted back and forth and are realized as transport belt sections supported pivotably around vertical axes. The disadvantages of these handling devices and methods are that the products can be damaged relatively easily, that it is difficult to adjust a dividing ratio on output transport belts and that there is a relatively high risk of injury due to the combination of moving parts, such as the transport belt sections that are pivotably supported around vertical axes or the like, with fixed parts, such as a machine frame of the main stream transport unit or an additional dividing mechanism or the like, so that protective measures must be taken. These disadvantages are overcome by the present invention.

Furthermore, handling devices for dividing a main product stream are already known from DE 25 16 583 A1, U.S. Pat. Nos. 9,517,896 B2, 6,227,377 B1, 1,292,820 A.

The objective of the invention is, in particular, to provide a generic handling device and a generic method with improved properties with regard to product-friendly conveying, a structurally simple adjustment of a dividing ratio and/or a high level of operator safety.

SUMMARY

The invention relates to a handling device for dividing a main product stream, in particular into at least two partial product streams, with at least one main stream transport unit which is realized as a main conveyor belt unit and by means of which the main product stream can be conveyed along the main conveying direction of the main stream transport unit, and with at least one division conveying unit which is configured for dividing the main product stream, in particular by discharging products and/or by dividing the main product stream into at least two partial product streams, wherein the division conveying unit has at least one division conveying element which is movable along a division conveying direction of the division conveying unit running at least substantially perpendicularly to the main conveying direction, which is realized as a division conveyor belt and by means of which the main product stream can be divided.

It is proposed that the handling device comprises at least one partial stream transport unit, in particular a partial stream conveyor belt unit, by means of which one of the partial product streams can be conveyed after the main product stream has been divided into at least two partial product streams, and comprises at least one further partial stream transport unit, in particular a further partial stream conveyor belt unit, by means of which a further one of the partial product streams can be conveyed, wherein the partial stream transport unit and/or the further partial stream transport unit are/is arranged offset with respect to the main stream transport unit along a direction that runs at least substantially perpendicularly to the main conveying plane, in particular to a horizontal plane, wherein in order to bridge the offset between the main stream transport unit and the partial stream transport unit and/or between the main stream transport unit and the further partial stream transport unit, the division conveying element is arranged inclined relative to the main conveying plane, in particular to the horizontal plane, wherein the dividing conveying element, in particular at least one conveying surface of the dividing conveying element, is arranged inclined relative to a main conveying plane of the main stream transport unit. The implementation of the handling device according to the invention advantageously allows achieving a structurally simple implementation of the division conveying unit, which has a small number of moving parts and enables an advantageous realization of a belt chute, in particular in a non-driven state of the division conveying element. Advantageously, as a result of influencing a drive parameter of the division conveying element, a structurally simple adjustment of a dividing ratio of the main product stream can be realized. For example, a belt chute can be realized as a result of a standstill of the division conveying element, so that conveyed products can slide on the conveying surface of the division conveying element, in particular without the effect of driving forces of the division conveying element on the conveyed products. For example, as a result of a drive of the division conveying element, a movement of conveyed products transversely to the main conveying direction can be realized, wherein a dividing ratio of conveyed products can be adjusted as a function of a speed or an acceleration of the division conveying element. Furthermore, especially in comparison to division conveying units having pushers that act mechanically on products, such as so-called paddle belt conveyors or the like, the division conveying element can advantageously enable product-friendly conveying, especially product-friendly dividing, of products. As a result of a small number of moving parts, the risk of injury to an operator can be advantageously kept to a minimum. Advantageously, especially in comparison to handling devices with a large number of moving parts, which in particular have a large mass, a large number of protective devices can be dispensed with, such as fencing of the handling device, as is known, for example, when using industrial robots, or the like. The division conveying unit, in particular the division conveying element, can advantageously be used as an alternative or in addition for dividing the main product stream for sorting out products from the main product stream. For example, with the alternative or additional sorting out function, it is conceivable that the damaged product or product with another defect is conveyed into a collection unit, such as a collection container, by means of the division conveying unit, in particular by means of the division conveying element. Other functions or areas of use of the division conveying unit that would appear to a person skilled in the art to be useful are also conceivable.

The handling device is preferably part of a production machine for manufacturing and/or packaging products, in particular foodstuffs and preferably confectionery, such as chocolate bars, biscuits, cookies or the like. The main stream transport unit is preferably realized as a main conveyor belt unit. Preferably, the main stream transport unit comprises at least one transport element, in particular a conveyor belt, by means of which products can be conveyed, in particular along the main conveying direction. The main conveying direction preferably runs at least substantially parallel to a horizontal plane. The main conveying direction preferably runs at least substantially parallel to a product support surface of the transport element, in particular in at least one embodiment of the handling device. Preferably, the main conveying direction runs at least substantially parallel to a longitudinal axis of the transport element, in particular in at least one embodiment of the handling device. The term "substantially parallel" is to be understood in particular as an orientation of a direction relative to a reference direction, in particular in a plane, wherein the direction has a deviation relative to the reference direction of in particular less than 8°, advantageously less than 5° and particularly advantageously less than 2°. The product support surface of the transport element preferably forms a surface of the transport element on which the products rest during conveying by means of the transport element.

Preferably, the main stream transport unit comprises at least one transport element embodied as a conveyor belt, on which the division conveying unit is arranged along the main conveying direction, in particular directly. Preferably, the transport element is embodied as a circulating conveyor belt. The transport element is preferably supported so as to be movable on a guide unit, in particular on a frame, of the main stream transport unit. The main stream transport unit preferably comprises at least one drive unit for a movement, in particular for a circulating drive, of the transport element relative to the frame of the main stream transport unit. The drive unit preferably comprises at least one electric motor. In particular, the electric motor is configured for a rotating drive of a drive roller, which rests against the transport element that is embodied as a conveyor belt. The electric motor can be connected directly to the drive roller or indirectly to the drive roller via, for example, a gearing mechanism, a belt drive, a chain, a toothed wheel or the like. Alternatively or additionally, the drive unit may have other components which appear to a person skilled in the art to be useful and which are configured to drive the transport element, or the drive unit may have another implementation which appears to a person skilled in the art to be useful, such as an implementation as an electrodynamic movement system, as is known, for example, from magnetic levitation technology.

It is conceivable that the main stream transport unit comprises a plurality of transport elements that are configured for transporting products and, in particular, are arranged in succession. "Configured" is in particular to mean specifically programmed, specifically implemented, specifically designed and/or specifically equipped. By the fact that an object or a unit is configured for a specific function, it should be understood in particular that the object or the unit fulfills and/or performs this specific function in at least one application and/or operating state. In an implementation of the main stream transport unit with a plurality of transport elements, the transport elements may have an analogous implementation, such as an implementation as conveyor belts, or the transport elements may be realized differently, for example an implementation of some transport elements as conveyor belts and some transport elements as chain or belt conveyors, an implementation of some transport elements as conveyor belts and some transport elements as electrodynamic transport elements, such as movers or the like, an implementation of some transport elements as conveyor belts and some transport elements as grippers or pushers or the like. It is also conceivable to combine the above-mentioned implementation variants of the main stream transport unit in a way that appears sensible to a person skilled in the art. If the main stream transport unit is realized with a large number of transport elements, the transport elements can be driven by means of a single drive unit or at least one individual drive unit is assigned to each transport element.

The division conveying unit is configured for dividing the main product stream in particular by discharging products and/or dividing the main product stream into at least two partial product streams. Preferably, the division conveying unit comprises the division conveying element, which is movable, in particular drivable, along the division conveying direction running transversely, in particular at least substantially perpendicularly, to the main conveying direction. The term "substantially perpendicularly" is intended in particular to define an orientation of a direction relative to a reference direction, wherein the direction and the reference direction, in particular viewed in a projection plane, include an angle of 90° and the angle has a maximum deviation of in particular less than 8°, advantageously less than 5° and particularly advantageously less than 2°. The division conveying element is preferably embodied as a division conveyor belt which can be driven along the division conveying direction running transversely, in particular at least substantially perpendicularly, to the main conveying direction. The division conveying unit preferably comprises at least one division drive unit for a movement, in particular for a circulating drive, of the division conveying element relative to a guide unit, in particular to a frame, of the division conveying unit. The division drive unit preferably comprises at least one electric motor. In particular, the electric motor is configured for a rotating drive of a drive roller that rests against the division conveying element, which is embodied as a division conveyor belt. The electric motor can be connected directly to the drive roller or indirectly to the drive roller via, for example, a gearing mechanism, a belt drive, a chain, a toothed wheel or the like. Alternatively or additionally, the division drive unit may have other components which appear to a person skilled in the art to be useful and which are configured to drive the division conveying element, or the division drive unit may have another implementation which appears to a person skilled in the art to be useful, such as an implementation as an electrodynamic movement system as is already known, for example, from conveyor technology.

Preferably, the division conveying element, in particular at least the conveying surface of the division conveying element, is arranged inclined relative to the main conveying plane of the main stream transport unit and to the main conveying direction in such a way that the division conveying element forms a belt chute, in particular in at least one operating state. The conveying surface of the division conveying element is preferably a surface of the division conveying element on which the products rest during conveying by means of the division conveying element. Preferably, the main conveying plane of the main stream transport unit is formed, in particular at least partially, by the product support surface of the transport element. Preferably, the division conveying element, in particular at least the conveying surface of the division conveying element, is arranged inclined relative to the product support surface of the transport element. An angle of inclination of the division conveying element, in particular of the conveying surface, relative to the main conveying plane and/or relative to the main conveying direction is preferably measured starting from the division conveying element, in particular starting from the conveying surface, in a direction facing away from a ground contact surface of the handling device. Preferably, the angle of inclination of the division conveying element, in particular of the conveying surface, relative to the main conveying plane and/or relative to the main conveying direction, viewed along the direction facing away from the ground contact surface of the handling device, is arranged between the conveying surface and the main conveying plane and/or the main conveying direction, in particular starting from the conveying surface. Preferably, the conveying surface and the main conveying plane and/or the main conveying direction include the angle of inclination on a side of the division conveying element facing away from the ground contact surface.

The main conveying plane and/or the main conveying direction of the main stream transport unit can be inclined to the ground contact surface of the handling device. However, it is also conceivable that the main conveying plane and/or the main conveying direction of the main stream transport unit are/is orientated at least substantially parallel to the ground contact surface of the handling device. The ground contact surface of the handling device is preferably formed by a surface of a machine frame of the handling device, by means of which the machine frame stands on a floor, in particular a production hall floor, in an operation-ready state of the handling device. The ground contact surface is preferably orientated at least substantially parallel to the horizontal plane. The main conveying plane and/or the main conveying direction of the main stream transport unit can be inclined to the horizontal plane. However, it is also conceivable that the main conveying plane and/or the main conveying direction of the main stream transport unit are/is orientated at least substantially parallel to the horizontal plane, in particular in at least one embodiment of the handling device. Alternatively or additionally, it is conceivable that an orientation of the main conveying plane and/or the main conveying direction of the main stream transport unit relative to the ground contact surface and/or relative to the horizontal plane is adjustable, in particular in steps or continuously variable. In the case of an adjustable orientation of the main conveying plane and/or the main conveying direction of the main stream transport unit relative to the ground contact surface and/or relative to the horizontal plane, it is conceivable that the orientation can be performed manually or with actuator support. Other embodiments that would appear to a person skilled in the art to be useful, in particular with regard to an orientation of the main conveying plane and/or the main conveying direction of the main stream transport unit relative to the ground contact surface and/or relative to the horizontal plane, are also conceivable.

Furthermore, it is proposed that an angle of inclination of the division conveying element, in particular of the conveying surface, relative to the main conveying plane and/or relative to the main conveying direction has a value from a value range between 0° and 90°. Preferably, the angle of inclination of the division conveying element, in particular of the conveying surface, relative to the main conveying plane and/or relative to the main conveying direction has a value which is greater than 0° and less than 90°, in particular when the angle of inclination is arranged on a side of the division conveying element facing away from the ground contact surface. Preferably, the angle of inclination of the division conveying element, in particular of the conveying surface, relative to the main conveying plane and/or relative to the main conveying direction has a value which is greater than 15° and less than 75°, in particular when the angle of inclination is arranged on a side of the division conveying element facing away from the ground contact surface. When measuring a further angle of inclination of the division conveying element, in particular of the conveying surface, relative to the main conveying plane and/or relative to the main conveying direction on a side of the division conveying element facing the ground contact surface, the further angle of inclination preferably has a value from a value range between 0° and 180°. Preferably, the further angle of inclination of the dividing conveying element, in particular of the conveying surface, relative to the main conveying plane and/or relative to the main conveying direction has a value which is greater than 0° and less than 180°, in particular when the further angle of inclination is arranged on a side of the dividing conveying element facing the ground contact surface. Preferably, the further angle of inclination of the dividing conveying element, in particular of the conveying surface, relative to the main conveying plane and/or relative to the main conveying direction has a value which is greater than 105° and less than 165°, in particular when the angle of inclination is arranged on a side of the dividing conveying element facing the ground contact surface. Preferably, a sum of the angle of inclination and the further angle of inclination is, in particular always, 180°. The implementation of the handling device according to the invention advantageously enables a structurally simple implementation of the division conveying unit, which has a small number of moving parts and enables an advantageous realization of a belt chute, in particular in a non-driven state of the division conveying element. Advantageously, a belt chute can be realized as a result of a standstill, in particular a non-driven state, of the division conveying element, so that conveyed products can slide on the conveying surface of the division conveying element, in particular without the effect of driving forces of the division conveying element on the conveyed products. Furthermore, especially in comparison to division conveying units having pushers that act mechanically on products, such as so-called paddle belt conveyors or the like, it is advantageously possible to enable product-friendly conveying, in particular product-friendly dividing, of products, by means of the division conveying element. Reliable conveying of products from the main stream conveyor unit via the division conveying unit to a subsequent partial stream transport unit and/or a further partial stream transport unit of the handling device can be realized in an advantageous manner.

Furthermore, it is proposed that the division conveying element is embodied as a division conveyor belt which can be driven in circulatory manner around a guide unit of the division conveying unit, the guide unit being at least substantially stationary, in particular relative to a guide unit of the main stream transport unit. The guide unit of the main stream transport unit is preferably realized as a frame on which the transport element, in particular the conveyor belt, of the main stream transport unit is movably supported. The guide unit of the division conveying unit is preferably realized as a frame on which the division conveying element that is embodied as a division conveyor belt is movably supported, in particular via guide and/or drive rollers. During operation of the handling device, the guide unit of the division conveying unit is preferably arranged so as to be stationary relative to the guide unit of the main stream transport unit. It is conceivable that a position of the guide unit of the division conveying unit can be adjusted relative to the guide unit of the main stream transport unit, in particular to adjust the angle of inclination of the division conveying element relative to the main conveying plane of the main stream transport unit and to the main conveying direction of the main stream transport unit, preferably in a non-operating state of the handling device. Preferably, in order to divide the main product stream by means of the division conveying unit, in particular only the division conveying element is moved relative to the guide unit of the division conveying unit and relative to the guide unit of the main stream transport unit. The guide unit of the division conveying unit preferably remains motionless during dividing of the main product stream. By means of the implementation of the handling device according to the invention, product-friendly conveying, in particular product-friendly dividing, of products by means of the division conveying element can be made possible advantageously, in particular in comparison to division conveying units having pushers that act mechanically on products, such as so-called paddle belt conveyors or the like. Advantageously, it is possible to achieve a structurally simple implementation of the division conveying unit, which has a small number of moving parts and enables an advantageous realization of a belt chute, in particular in a non-driven state of the division conveying element. Advantageously, as a result of influencing a drive parameter of the division conveying element, a structurally simple adjustment of a dividing ratio of the main product stream can be realized. For example, a belt chute can be realized as a result of a standstill of the division conveying element, so that conveyed products can slide on the conveying surface of the division conveying element, in particular without the effect of driving forces of the division conveying element on the conveyed products. For example, as a result of a drive of the division conveying element, a movement of conveyed products transversely to the main conveying direction can be realized, wherein a dividing ratio of conveyed products can be adjusted as a function of a speed or an acceleration of the division conveying element.

According to the invention, the handling device comprises at least the partial stream transport unit, in particular a partial stream conveyor belt unit, by means of which one of the partial product streams can be conveyed after the main product stream has been divided into at least two partial product streams, and at least the further partial stream transport unit, in particular a further partial stream conveyor belt unit, by means of which one of the partial product streams can be conveyed after the main product stream has been divided into at least two partial product streams, wherein the partial stream transport unit and/or the further partial transport unit are/is arranged offset to the main stream transport unit along a direction running at least substantially perpendicularly to the main conveying plane, in particular to the horizontal plane, wherein the division conveying element is arranged inclined relative to the main conveying plane, in particular to the horizontal plane, and/or relative to the main conveying direction in order to bridge the offset between the main stream transport unit and the partial stream transport unit and/or between the main stream transport unit and the further partial stream transport unit. Preferably, products from the main product stream are transferred to the partial stream transport unit and/or to the further partial stream transport unit by means of the division conveying unit. A dividing ratio of conveyed products is preferably adjustable as a function of a speed or acceleration of the division conveying element. When the division conveying element is at a standstill, in particular in a motionless state, the products of the main product stream are transferred undivided from the division conveying element to the partial stream transport unit, in particular as a result of the products sliding down the division conveying element onto the partial stream transport unit. In a driven state of the division conveying element, the products of the main product stream are divided onto the dividing stream transport unit and the further dividing stream transport unit depending on a speed or an acceleration of the division conveying element, wherein the main product stream is divided into the partial product stream along the dividing stream transport unit and into the further partial product stream along the further dividing stream transport unit. Preferably, the partial stream transport unit has a partial stream transport element that is embodied as a conveyor belt. The partial stream transport unit is preferably arranged downstream of the division conveying unit. Preferably, the partial stream transport element of the partial stream transport unit adjoins, in particular directly adjoins, the division conveying element. A partial stream conveying direction of the partial stream transport unit preferably runs at least substantially parallel to the main conveying direction of the main stream transport unit. However, it is also conceivable that the partial stream conveying direction of the partial stream transport unit runs transversely to the main conveying direction of the main stream transport unit. It is conceivable that a further division conveying unit of the handling device is arranged downstream of the partial stream transport unit in order to realize a buffer function in the partial product stream of the partial stream transport unit. In particular, the further partial stream transport unit has a partial stream transport element that is embodied as a conveyor belt. The further partial stream transport unit is preferably arranged downstream of the division conveying unit. Preferably, the partial stream transport element of the further partial stream transport unit adjoins, in particular directly adjoins, the division conveying element. A partial stream conveying direction of the further partial stream transport unit preferably runs transversely to the main conveying direction of the main stream transport unit. However, it is also conceivable that the partial stream conveying direction of the further partial stream transport unit runs at least substantially parallel to the main conveying direction of the main stream transport unit. It is conceivable that an additional division conveying unit of the handling device is arranged downstream of the further partial stream transport unit in order to realize a buffer function in the partial product stream of the further partial stream transport unit. Other arrangements of partial stream transport units and/or division conveying units which appear to a person skilled in the art to be useful are also conceivable. By means of the implementation according to the invention, a structurally simple division into different transport lines can be made possible. Advantageously, as a result of influencing a drive parameter of the division conveying element, a structurally simple adjustment of a dividing ratio of the main product stream into multiple partial product streams can be realized. It is structurally simple to divide the main product stream by a drive or a non-drive of the division conveying element.

Furthermore, it is proposed that the handling device comprises at least one adjustment unit for an, in particular continuous, adjustment of an angle of inclination, in particular the angle of inclination already mentioned above, of the division conveying element, in particular the conveying surface, relative to the main conveying plane and/or relative to the main conveying direction, in particular by means of a movable support of the division conveying element around a pivot axis of the adjustment unit that runs at least substantially parallel to the dividing conveying direction. For example, it is conceivable that the guide unit of the division conveying unit is supported so as to be pivotable on the guide unit of the main stream transport unit, in particular in order to realize an adjustment of the angle of inclination of the division conveying element. The pivot axis preferably runs at least substantially parallel to the main conveying plane and at least substantially perpendicularly to the main conveying direction. It is conceivable that the adjustment unit comprises at least one actuator, which is configured in order to generate a drive force for adjusting the angle of inclination of the division conveying element. The actuator can be realized as a servomotor, a spindle motor or any other actuator that would appear to a person skilled in the art to be useful. Alternatively, it is conceivable that the adjustment unit is realized as a manual adjustment unit and is configured to adjust the angle of inclination of the division conveying element by the application of force by an operator. By means of the implementation according to the invention, an advantageous adaptation to the conditions of an installation site or to customer requirements can be made possible. Advantageously, it is possible to achieve a structurally simple implementation of the division conveying unit, which has a small number of moving parts and enables an advantageous realization of a belt chute, in particular in a non-driven state of the division conveying element, in particular a belt chute which is adjustable at least with respect to an inclination.

In addition, it is proposed that the handling device comprises at least one bridging unit, in particular comprising at least one, preferably elastic, bridging element, at least for bridging or covering a gap between the division conveying unit and the main stream transport unit. Preferably, the bridging element is made of rubber, in particular an elastomer. The bridging element is preferably realized as a rubber lip. It is also conceivable that the bridging element is formed from a plastic and is arranged as a kind of intermediate piece, such as a ramp or the like, between the transport element and the division conveying element. However, it is also conceivable that the bridging element has a different implementation which appears to a person skilled in the art to be useful and/or is formed from a different material which appears to a person skilled in the art to be useful. Preferably, the bridging unit comprises at least one further bridging element, which is configured for bridging or covering a gap between the division conveying unit and the partial stream transport unit and/or between the division conveying unit and the further partial stream transport unit. The further bridging element may have an analogous implementation to the bridging element or a different implementation to the bridging element. By means of the implementation according to the invention, products can be advantageously protected during a transition after the belt chute. In addition, with a flexibly adjustable angle of inclination, a gentle transfer from the division conveying unit to the partial stream transport units can advantageously take place, in particular since a gap between the division conveying unit and the partial stream transport units can be kept small or avoided as far as possible. Advantageously, it is possible to achieve a structurally simple implementation of the division conveying unit, which has a small number of moving parts and enables an advantageous realization of a belt chute, in particular in a non-driven state of the division conveying element.

It is further proposed that the handling device comprises at least one control or regulation unit for controlling or regulating the division conveying unit, wherein the control or regulation unit is configured for a control or regulation of at least one speed parameter of the division conveying unit for influencing the dividing of the main product stream. A "control or regulation unit" is to be understood in particular as a unit having at least one electronic control unit. In particular, "electronic control unit" should be understood to mean a unit having a processor unit and having a memory unit as well as having an operating program stored in the memory unit. The control or regulation unit may moreover be configured for a control or regulating of the adjustment unit, in particular the actuator of the adjustment unit, in particular in order to automatically adjust the angle of inclination of the division conveying element. Preferably, the handling device comprises at least one sensor unit, which is configured for detecting product parameters of the conveyed products or a production-specific parameter. The sensor unit is preferably connected to the control or regulation unit via data technology. Preferably, a speed parameter of the division conveying unit is controlled by means of the control or regulation unit depending on the product parameters recorded by the sensor unit. Alternatively or additionally, it is also conceivable that the control or regulation unit is configured for a control or regulation of the at least one speed parameter of the division conveying unit so as to influence the dividing of the main product stream in accordance with a program that runs independently of sensor data or to control or regulate it in accordance with a demand-oriented dividing. The sensor unit preferably comprises at least one sensor element for detecting product parameters. The sensor element may have any implementation that would appear to a person skilled in the art to be useful, such as an implementation as a camera, a line laser, an infrared sensor, a light barrier, a weighing sensor, a position sensor or the like. The sensor unit can have a large number of sensor elements in order to detect different product parameters. However, it is also conceivable that the sensor unit comprises only a single sensor element, by means of which a single product parameter or different product parameters can be detected. Other implementations of the sensor unit that would appear to a person skilled in the art to be useful are also conceivable. The product parameter can, for example, be a condition of a product (defective product or OK product), a weight of a product, a size of a product, a position of a product, an orientation of a product or the like. A production-specific parameter can be a number of products, a sequence of products or the like. By means of the implementation according to the invention, a structurally simple implementation of the division conveying unit can be advantageously achieved, which has a small number of moving parts and enables an advantageous realization of a belt chute, in particular in a non-driven state of the division conveying element. Advantageously, as a result of influencing a drive parameter of the division conveying element, a structurally simple adjustment of a dividing ratio of the main product stream can be realized. For example, a belt chute can be realized as a result of a standstill of the division conveying element, so that conveyed products can slide on the conveying surface of the division conveying element, in particular without the effect of driving forces of the division conveying element on the conveyed products. For example, as a result of a drive of the division conveying element, a movement of conveyed products transversely to the main conveying direction can be realized, wherein a dividing ratio of conveyed products can be adjusted as a function of a speed or an acceleration of the division conveying element.

Furthermore, a production machine with at least one handling device according to the invention is proposed. The production machine may comprise further devices which appear to a person skilled in the art to be useful, such as, for example, a manufacturing device for manufacturing products, a packaging device for packaging products, a sterilization device for sterilizing packages and/or products or other devices which appear to a person skilled in the art to be useful. It is possible by means of the embodiment according to the invention to advantageously achieve a production machine, by means of which product-friendly conveying, a constructively simple adjustment of a dividing ratio and/or a high operator safety can be achieved.

In addition, the invention relates to a method for dividing a main product stream, in particular into at least two partial product streams, by means of a handling device according to the invention. It is proposed that, as a function of a speed parameter of the division conveying unit, in particular as a function of a conveyor belt speed of the division conveying element, a movement of the products along the main conveying direction on the division conveying element is superimposed by a movement of the products along the dividing conveying direction, wherein, in a driven state of the division conveying element, the products of the main product stream are divided onto the partial stream transport unit and the further partial stream transport unit depending on a speed or an acceleration of the division conveying element, wherein the main product stream is divided into a partial product stream along the partial stream transport unit and into a further partial product stream along the further partial stream transport unit. It is further proposed that due to a sliding friction between the dividing conveying element, in particular the conveying surface, and the products, the products are in a conveying-free state of the dividing conveying unit conveyed along the main conveying direction via the dividing conveying element, in particular via the conveying surface. With regard to further method steps of the method for dividing a main product stream, reference may be made to the preceding description of the handling device and/or the production machine, since this description is also to be read analogously to the method and thus all features with regard to the handling device and/or the production machine are also deemed to be disclosed with regard to the method for dividing a main product stream. By means of the embodiment according to the invention, a structurally simple adjustment of a dividing ratio of the main product stream can be advantageously realized as a result of influencing a drive parameter of the division conveying element. For example, a belt chute can be realized as a result of a standstill of the division conveying element, so that conveyed products can slide on the conveying surface of the division conveying element, in particular without the effect of driving forces of the division conveying element on the conveyed products. For example, as a result of a drive of the division conveying element, a movement of conveyed products transversely to the main conveying direction can be realized, wherein a dividing ratio of conveyed products can be adjusted as a function of a speed or an acceleration of the division conveying element. Furthermore, especially in comparison to division conveying units having pushers that act mechanically on products, such as so-called paddle belt conveyors or the like, product-friendly conveying, in particular product-friendly dividing, of products can be made possible by means of the division conveying element. The division conveying unit, in particular the division conveying element, can advantageously be used as an alternative to or in addition to dividing the main product stream for sorting out products from the main product stream. For example, with the alternative or additional sorting out function, it is conceivable that the damaged product or product with another defect is conveyed into a collection unit, such as a collection container, by means of the division conveying unit, in particular by means of the division conveying element. Other functions or areas of use of the division conveying unit that would appear to a person skilled in the art to be useful are also conceivable.

The handling device according to the invention, the production machine according to the invention and/or the method according to the invention is not be limited to the application and embodiment described above. In particular, the handling device according to the invention, the production machine according to the invention and/or the method according to the invention can/can have a number of individual elements, components and units as well as method steps deviating from a number mentioned herein in order to fulfill a mode of operation described herein. In addition, in the case of the value ranges stated in this disclosure, values lying within the stated limits are also to be regarded as disclosed and as usable as desired.

BRIEF DESCRIPTION OF THE DRAWINGS

Further advantages are shown in the following description of the drawings. The drawings show embodiment examples of the invention. The drawings, the description and the claims contain numerous features in combination. The person skilled in the art will also expediently consider the features individually and combine them to form useful further combinations.

DETAILED DESCRIPTION

Figure 1:
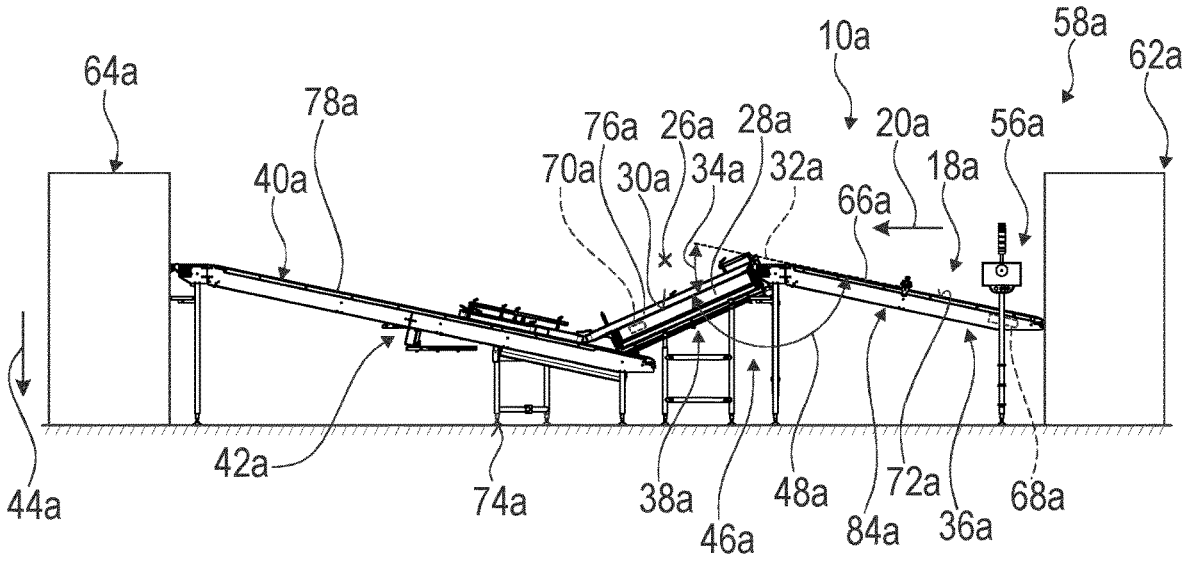
FIG. 1 shows a production machine according to the invention with a handling device according to the invention for dividing a main product stream in a schematic representation.

FIG. 1 shows a production machine 58*a* for manufacturing and/or packaging products 24*a*, in particular food products. The production machine 58*a* preferably comprises at least one manufacturing device 62*a* for manufacturing the products 24*a* (see FIG. 2), in particular confectionery, such as chocolate bars, biscuits, cookies or the like. The production machine 58*a* comprises at least one handling device 10*a* for handling the products 24*a*. The handling device 10*a* is preferably configured for dividing a main product stream 12*a* of the products 24*a*, in particular for dividing the main product stream 12*a* into at least two partial product streams 14*a*, 16*a* (see FIG. 2). Preferably, each of the partial product streams 14*a*, 16*a* is fed to a separate packaging device 64*a* of the production machine 58*a* (in FIG. 1 only one packaging device 64*a* is shown as an example). However, it is also conceivable that the partial product streams 14*a*, 16*a* are fed to other devices of the production machine 58*a* which appear to a person skilled in the art to be useful. The handling device 10*a* may alternatively or additionally be configured for other functions which appear to a person skilled in the art to be useful, such as discharging products 24*a*, buffering products 24*a* or the like. Preferably, the production machine 58*a* comprises at least one packaging device 64*a* for packaging the products 24*a*. The handling device 10*a* is preferably arranged in an area between the production device 62*a* and the packaging device 64*a*, in particular viewed along a course of a product stream. However, it is also conceivable that the handling device 10*a* is alternatively arranged at another position within the production machine 58*a* or a production line comprising at least the handling device 10*a* that appears to a person skilled in the art to be reasonable. The production machine 58*a* may comprise further devices which appear to a person skilled in the art to be useful, such as a sterilization device for sterilizing packages and/or products 24*a* or other devices which appear to a person skilled in the art to be useful.

Figure 2:
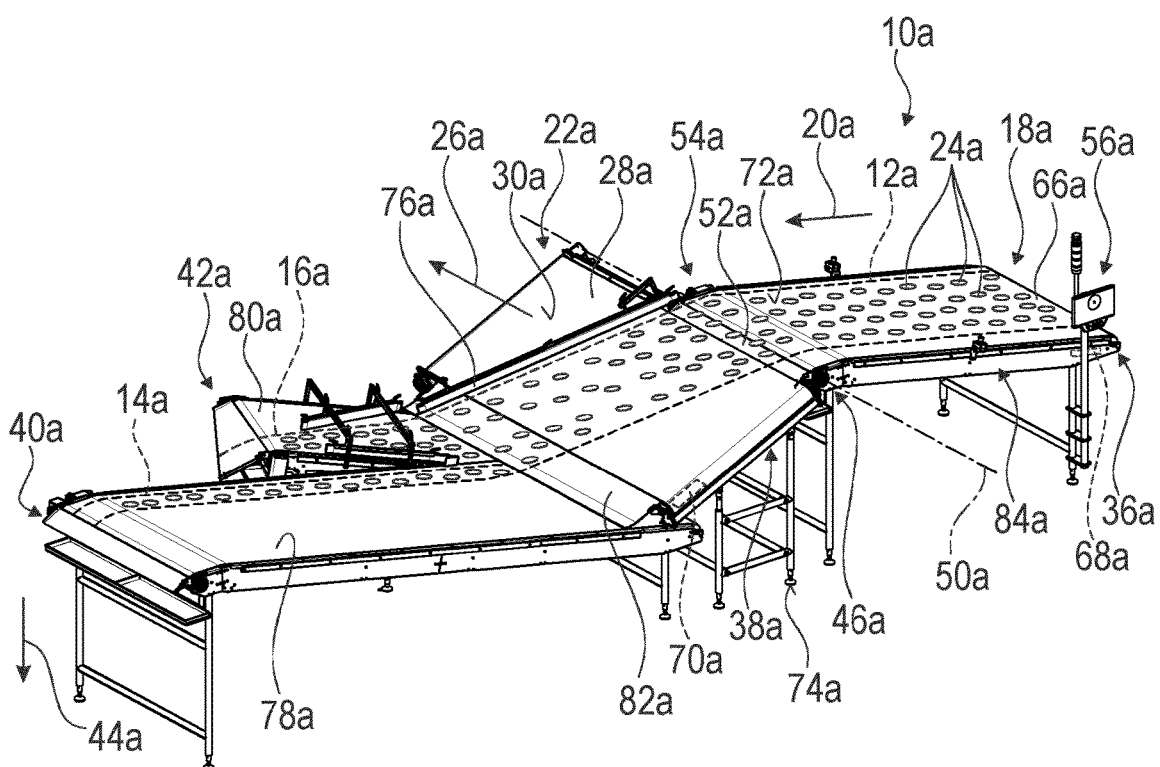
FIG. 2 shows a detailed view of the handling device according to the invention in a schematic representation.

FIG. 2 shows a detailed view of the handling device 10*a* for dividing the main product stream 12*a*, in particular into at least two partial product streams 14*a*, 16*a*. The handling device 10*a* comprises at least one main stream transport unit 18*a*, in particular a main conveyor belt unit, by means of which the main product stream 12*a* can be conveyed along a main conveying direction 20*a* of the main stream transport unit 18*a*. Preferably, the main stream transport unit 18*a* comprises at least one transport element 66*a*, in particular a conveyor belt, by means of which the products 24*a* can be conveyed, in particular along the main conveying direction 20*a*. The main conveying direction 20*a* preferably runs at least substantially parallel to a horizontal plane. Preferably, the transport element 66*a* is embodied as a circulating conveyor belt. The transport element 66*a* is preferably supported in a movable manner on a guide unit 36*a*, in particular on a frame, of the main stream transport unit 18*a*. The main stream transport unit 18*a* preferably comprises at least one drive unit 68*a* for a movement, in particular for a circulating drive, of the transport element 66*a* relative to the guide unit 36*a*, in particular to the frame, of the main stream transport unit 18*a*. The drive unit 68*a* preferably comprises at least one electric motor (not shown here in more detail). In particular, the electric motor is configured for a rotating drive of a drive roller (not shown in more detail here), which is in contact with the transport element 66*a*, which is embodied as a conveyor belt. The electric motor can be connected directly to the drive roller or indirectly to the drive roller via, for example, a gearing mechanism, a belt drive, a chain, a toothed wheel or the like. The drive unit 68*a* may alternatively or additionally have other components which appear to a person skilled in the art to be useful and which are configured for driving the transport element 66*a*, or the drive unit 68*a* and/or the transport element 66*a* may have another implementation which appears to a person skilled in the art to be useful. The transport element 66*a*, in particular a product support surface 72*a* of the transport element 66*a*, is oriented inclined relative to the horizontal plane, in particular in the embodiment example of the handling device 10*a* shown in FIGS. 1 to 3.

Furthermore, the handling device 10*a* comprises at least one division conveying unit 22*a*, which is configured for dividing the main product stream 12*a*, in particular by discharging products 24*a* and/or by dividing the main product stream 12*a* into at least two partial product streams 14*a*, 16*a*. The division conveying unit 22*a* has at least one division conveying element 28*a*, in particular a division conveyor belt, which is movable along a division conveying direction 26*a* of the division conveying unit 22*a* running transversely, in particular at least substantially perpendicularly, to the main conveying direction 20*a* and by means of which the main product stream 12*a* can be divided. The division conveying unit 22*a*, in particular the division conveying element 28*a*, follows downstream along the main conveying direction 20*a*, in particular directly, onto the transport element 66*a* of the main stream transport unit 18*a*. Preferably, the division conveying element 28*a* is movable, in particular drivable, along the division conveying direction 26*a* running transversely, in particular at least substantially perpendicularly, to the main conveying direction 20*a*. The division conveying element 28*a*, which is embodied as a division conveyor belt, is drivable in circulatory manner around a guide unit 38*a* of the division conveying unit 22*a*, the guide unit 38*a* being in particular at least substantially stationary relative to the guide unit 36*a* of the main stream transport unit 18*a*. The division conveying unit 22*a* preferably comprises at least one division drive unit 70*a* for a movement, in particular for a rotating drive, of the division conveying element 28*a* relative to the guide unit 38*a*, in particular to a frame, of the division conveying unit 22*a*. The division drive unit 70*a* preferably comprises at least one electric motor (not shown here in more detail). In particular, the electric motor is configured for a rotating drive of a drive roller (not shown in more detail here), which is in contact with the division conveying element 28*a* that is embodied as a division conveyor belt. The electric motor can be connected directly to the drive roller or indirectly to the drive roller via, for example, a gearing mechanism, a belt drive, a chain, a toothed wheel or the like. The division drive unit 70*a* may alternatively or additionally have further components which appear to a person skilled in the art to be useful and which are configured for driving the division conveying element 28*a*, or the division drive unit 70*a* and/or the division conveying element 28*a* may have a different implementation which appears to a person skilled in the art to be useful.

Figure 3:
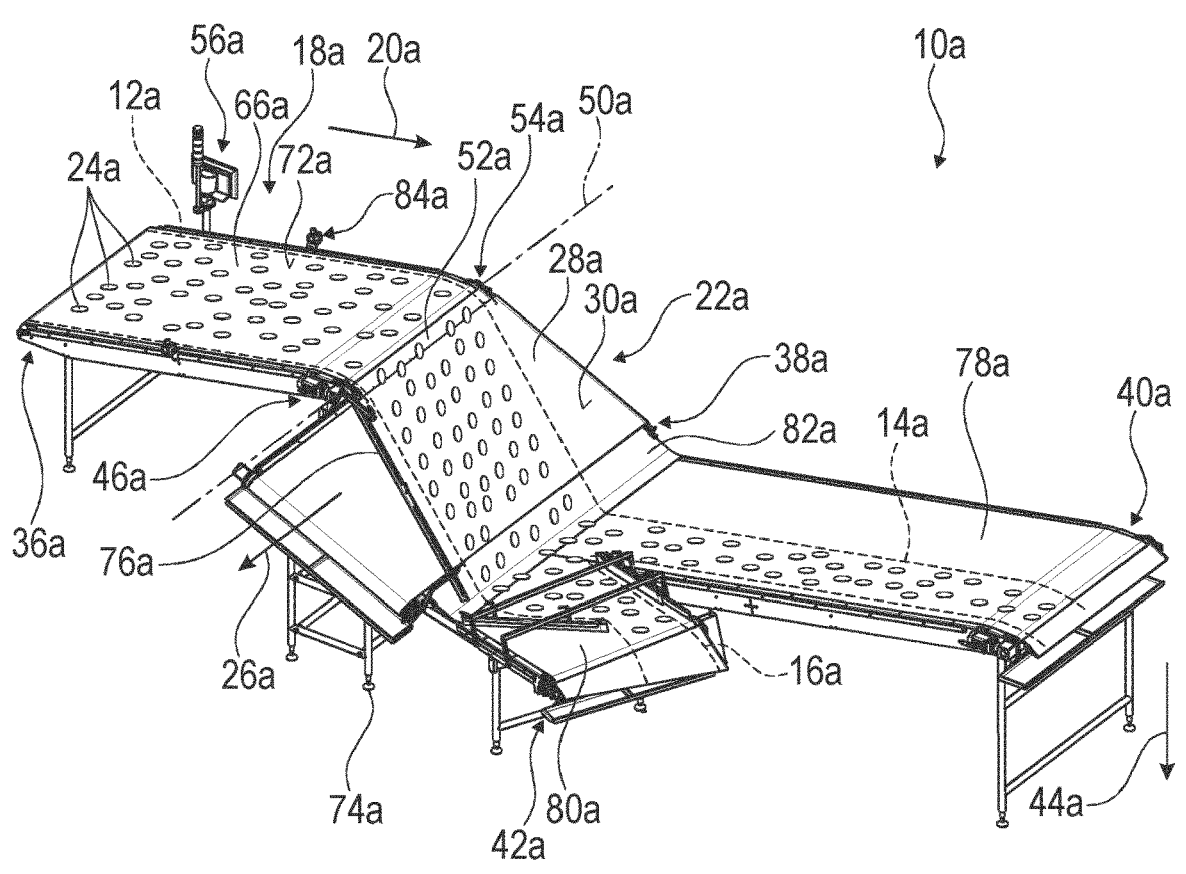
FIG. 3 shows a further detailed view of the handling device according to the invention in a schematic representation.

Preferably, the handling device 10*a* comprises at least one control or regulation unit 56*a* for controlling or regulating the division conveying unit 22*a*, wherein the control or regulation unit 56*a* is configured for a control or regulation of at least one speed parameter of the division conveying unit 22*a* for influencing the dividing of the main product stream 12a (cf. FIGS. 2 and 3). Preferably, the handling device 10a comprises at least one sensor unit 84a, which is configured for detecting product parameters of the conveyed products 24a or a production-specific parameter of the production machine 58a (cf. FIGS. 2 and 3). The sensor unit 84a is preferably connected to the control or regulation unit 56a in terms of data technology. Preferably, a speed parameter of the division conveying unit 22a is controlled or regulated by means of the control or regulation unit 56a as a function of product parameters recorded by means of the sensor unit 84a and/or recorded production-specific parameters. Alternatively or additionally, it is also conceivable that the control or regulation unit 56a is configured for a control or regulation of the at least one speed parameter of the division conveying unit 22a for influencing the dividing of the main product stream 12a in accordance with a program that runs independently of sensor data, or to control or regulate it in accordance with a demand-oriented dividing. The sensor unit 84a preferably comprises at least one sensor element (not shown here in more detail) for detecting product parameters or for detecting production-specific parameters. The sensor element may have any implementation that appears to a person skilled in the art to be useful, such as an implementation as a camera, as a line laser, as an infrared sensor, as a light barrier, as a weighing sensor, as a position sensor or the like. The sensor unit 84a can have a plurality of sensor elements in order to detect different product parameters and/or production-specific parameters.

The division conveying element 28a, in particular at least one conveying surface 30a of the division conveying element 28a, is arranged inclined relative to a main conveying plane 32a of the main stream transport unit 18a. Preferably, the division conveying element 28a, in particular at least the conveying surface 30a of the division conveying element 28a, is arranged inclined relative to the main conveying plane 32a of the main stream transport unit 18a and to the main conveying direction 20a in such a way that the division conveying element 28a forms a belt chute, in particular in at least one operating state. The conveying surface 30a of the division conveying element 28a is preferably a surface of the division conveying element 28a on which the products 24a rest during conveying by means of the division conveying element 28a. Preferably, the main conveying plane 32a of the main stream transport unit 18a is formed, in particular at least partially, by the product support surface 72a of the transport element 66a of the main stream transport unit 18a. Preferably, the division conveying element 28a, in particular at least the conveying surface 30a of the division conveying element 28a, is arranged inclined relative to the product support surface 72a of the transport element 66a of the main stream transport unit 18a. An angle of inclination 34a of the division conveying element 28a, in particular of the conveying surface 30a of the division conveying element 28a, relative to the main conveying plane 32a and/or relative to the main conveying direction 20a is preferably measured starting from the division conveying element 28a, in particular starting from the conveying surface 30a of the division conveying element 28a, in a direction facing away from a ground contact surface 74a of the handling device 10a. Preferably, the angle of inclination 34a of the division conveying element 28a, in particular of the conveying surface 30a of the division conveying element 28a, relative to the main conveying plane 32a and/or relative to the main conveying direction 20a, viewed along the direction facing away from the ground contact surface 74a of the handling device 10a, is arranged between the conveying surface 30a of the division conveying element 28a and the main conveying plane 32a and/or the main conveying direction 20a, in particular starting from the conveying surface 30a of the division conveying element 28a. Preferably, the conveying surface 30a of the division conveying element 28a and the main conveying plane 32a and/or the main conveying direction 20a include the inclination angle 34a on a side of the division conveying element 28a facing away from the ground contact surface 74a.

The angle of inclination 34a of the division conveying element 28a, in particular of the conveying surface 30a of the division conveying element 28a, relative to the main conveying plane 32a and/or relative to the main conveying direction 20a, has a value from a value range between 0° and 90°. Preferably, the angle of inclination 34a of the division conveying element 28a, in particular of the conveying surface 30a of the division conveying element 28a, relative to the main conveying plane 32a and/or relative to the main conveying direction 20a has a value which is greater than 15° and less than 75°. When measuring a further angle of inclination 48a of the division conveying element 28a, in particular of the conveying surface 30a of the division conveying element 28a, relative to the main conveying plane 32a and/or relative to the main conveying direction 20a on a side of the division conveying element 28a facing the ground contact surface 74a, the further angle of inclination 48a preferably has a value from a value range between 0° and 180°. Preferably, the further angle of inclination 48a of the division conveying element 28a, in particular of the conveying surface 30a of the division conveying element 28a, relative to the main conveying plane 32a and/or relative to the main conveying direction 20a has a value which is greater than 0° and less than 180°. Preferably, the further angle of inclination 48a of the division conveying element 28a, in particular of the conveying surface 30a of the division conveying element 28a, relative to the main conveying plane 32a and/or relative to the main conveying direction 20a has a value which is greater than 105° and less than 165°. Preferably, a sum of the inclination angle 34a and the further inclination angle 48a is, in particular always, 180°.

The handling device 10a preferably comprises at least one adjustment unit 46a for an, in particular continuous, adjustment of the angle of inclination 34a and/or the further angle of inclination 48a of the division conveying element 28a, in particular of the conveying surface 30a of the division conveying element 28a, relative to the main conveying plane 32a and/or relative to the main conveying direction 20a, in particular by a movable support of the division conveying element 28a around a pivot axis 50a of the adjustment unit 46a that runs at least substantially parallel to the dividing conveying direction 26a (cf. FIGS. 2 and 3). For example, it is conceivable that the guide unit 38a of the division conveying unit 22a is supported in a pivotable manner on the guide unit 36a of the main stream transport unit 18a. The pivot axis 50a preferably runs at least substantially parallel to the main conveying plane 32a and at least substantially perpendicularly to the main conveying direction 20a. It is conceivable that the adjustment unit 46a comprises at least one actuator (not shown here in more detail), which is configured to generate a drive force for adjusting the angle of inclination 34a and/or the further angle of inclination 48a of the division conveying element 28a. The actuator can be realized as a servomotor, as a spindle motor or as another actuator which appears to a person skilled in the art to be useful. Alternatively, it is conceivable that the adjustment unit 46a is realized as a manual adjustment unit and is configured for adjusting the angle of inclination 34a and/or the further angle of inclination 48a of the division conveying element 28a by an operator applying force.

The handling device 10a preferably comprises at least one partial stream transport unit 40a, in particular a partial stream conveyor belt unit, by means of which one of the partial product streams 14a. 16a can be conveyed after the main product stream 12a has been divided into the at least two partial product streams 14a, 16a, and at least one further partial stream transport unit 42a, in particular a further partial stream conveyor belt unit, by means of which a further one of the partial product streams 14a. 16a can be conveyed after the main product stream 12a has been divided into the at least two partial product streams 14a, 16a. The partial stream transport unit 40a and/or the further partial stream transport unit 42a are/is arranged offset to the main stream transport unit 18a, in particular to the transport element 66a of the main stream transport unit 18a, along a direction 44a running at least substantially perpendicularly to the main conveying plane 32a, in particular to the horizontal plane. In order to bridge the offset between the main stream transport unit 18a and the partial stream transport unit 40a and/or between the main stream transport unit 18a and the further partial stream transport unit 42a, the division conveying element 28a is arranged inclined relative to the main conveying plane 32a, in particular to the horizontal plane. Preferably, products 24a are transferred from the main product stream 12a to the partial stream transport unit 40a and/or to the further partial stream transport unit 42a by means of the division conveying unit 22a. A dividing ratio of conveyed products 24a is preferably adjustable as a function of a speed or an acceleration of the division conveying element 28a. When the division conveying element 28a is at a standstill, in particular in a motionless state, the products 24a of the main product stream 12a are transferred undivided from the division conveying element 28a to the partial stream transport unit 40a, in particular as a result of the products 24a sliding down the division conveying element 28a onto the partial stream transport unit 40a. In a driven state of the division conveying element 28a, the products 24a of the main product stream 12a are divided onto the partial stream transport unit 40a and the further partial stream transport unit 42a depending on a speed or an acceleration of the division conveying element 28a, wherein the main product stream 12a is divided into the partial product stream 14a along the partial stream transport unit 40a and into the further partial product stream 16a along the further partial stream transport unit 42a.

With regard to an arrangement in relation to the main stream transport unit 18a, the partial stream transport unit 40a preferably forms an extension of the main stream transport unit 18a along the main conveying direction 20a. With regard to an arrangement in relation to the main stream transport unit 18a, the further partial stream transport unit 42a preferably forms a branch of the main stream transport unit 18a transversely to the main conveying direction 20a. The partial stream transport unit 40a and the further partial stream transport unit 42a are preferably arranged at an angle to one another, in particular viewed in a horizontally running plane.

The division conveying unit 22a preferably comprises at least one guiding element 76a, which is configured for selectively feeding products 24a, which are divided off or discharged from the main product stream 12a by means of the division conveying element 28a, to the partial stream transport unit 40a and/or the further partial stream transport unit 42a. The guiding element 76a preferably runs transversely across the dividing conveying element 28a, in particular along a direction running transversely to the main conveying direction 20a and/or transversely to the dividing conveying direction 26a. The guiding element 76a is preferably configured to guide products 24a, which could be carried beyond the division conveying element 28a as a result of an acceleration of the division conveying element 28a for dividing the main product stream 12a, specifically in the direction of the partial stream transport unit 40a and/or the further partial stream transport unit 42a. The guiding element 76a can be realized as a stop, a belt, a guard rail, a side wall or the like. It is conceivable that the division conveying unit 22a comprises a plurality of guiding elements 76a, which are configured to selectively feed products 24a, which are divided off or discharged from the main product stream 12a by means of the division conveying element 28a, to the partial stream transport unit 40a and/or the further partial stream transport unit 42a. Preferably, the division conveying unit 22a has one or more guiding element(s) 76a only in the region of the further partial stream transport unit 42a. Preferably, the guiding element(s) 76a is/are supported movably, in particular in order to adjust a position of the guiding element(s) 76a relative to the division conveying element 28a. The guiding element(s) 76a may be supported so as to movable continuously or stepwise. The guiding element(s) 76a can be adjustable manually or with actuator support.

Preferably, the partial stream transport unit 40a has a partial stream transport element 78a that is embodied as a conveyor belt. The partial stream transport unit 40a is preferably arranged downstream of the division conveying unit 22a. Preferably, the partial stream transport element 78a of the partial stream transport unit 40a adjoins, in particular directly adjoins, the division conveying element 28a. A partial stream conveying direction of the partial stream transport unit 40a preferably runs at least substantially parallel to the main conveying direction 20a of the main stream transport unit 18a. However, it is also conceivable that the partial stream conveying direction of the partial stream transport unit 40a runs transversely to the main conveying direction 20a of the main stream transport unit 18a. It is conceivable that a further division conveying unit (not shown here in more detail) of the handling device 10a is arranged downstream of the partial stream transport unit 40a in order to realize a buffer function in the partial product stream 14a of the partial stream transport unit 40a.

Preferably, the further partial stream transport unit 42a has a partial stream transport element 80a that is embodied as a conveyor belt. The further partial stream transport unit 42a is preferably arranged downstream of the division conveying unit 22a. Preferably, the partial stream transport element 80a of the further partial stream transport unit 40a adjoins, in particular directly adjoins, the division conveying element 28a. A partial stream conveying direction of the further partial stream transport unit 42a preferably runs transversely to the main conveying direction 20a of the main stream transport unit 18a. However, it is also conceivable that the partial stream conveying direction of the further partial stream transport unit 42a runs at least substantially parallel to the main conveying direction 20a of the main stream transport unit 18a. It is conceivable that an additional division conveying unit (not shown here in more detail) of the handling device 10a is arranged downstream of the further partial stream transport unit 42a in order to realize a buffer function in the further partial product stream 16a of the further partial stream transport unit 42a. The partial stream transport unit 40a, in particular a product support surface of the partial stream transport element 78a of the partial stream transport unit 40a, and/or the further partial stream transport unit 42a, in particular a product support surface of the partial stream transport element 80a of the further partial stream transport unit 42a, are/is preferably, in particular in the embodiment example of the handling device 10a shown in FIGS. 1 to 3, oriented inclined relative to the horizontal plane.

The handling device 10a preferably comprises at least one bridging unit 54a, in particular comprising at least one, preferably elastic, bridging element 52a, at least for bridging or covering a gap between the division conveying unit 22a and the main stream transport unit 18a (see FIGS. 2 and 3). Preferably, the bridging element 52a is formed from rubber, in particular from an elastomer. The bridging element 52a is preferably formed as a rubber lip, a rubber strip, a rubber extension or the like. It is also conceivable that the bridging element 52a is formed from a plastic and is arranged as a kind of intermediate piece, such as a ramp or the like, between the transport element 66a and the division conveying element 28a. However, it is also conceivable that the bridging element 52a has a different implementation which appears to a person skilled in the art to be useful and/or is formed from a different material which appears to a person skilled in the art to be useful. Preferably, the bridging unit 54a comprises at least one further bridging element 82a, which is configured for bridging or covering a gap between the division conveying unit 22a and the partial stream transport unit 40a and/or between the division conveying unit 22a and the further partial stream transport unit 42a. The further bridging element 82a may have an analogous implementation to the bridging element 52a or may have a different implementation to the bridging element 52a.

Figure 4:
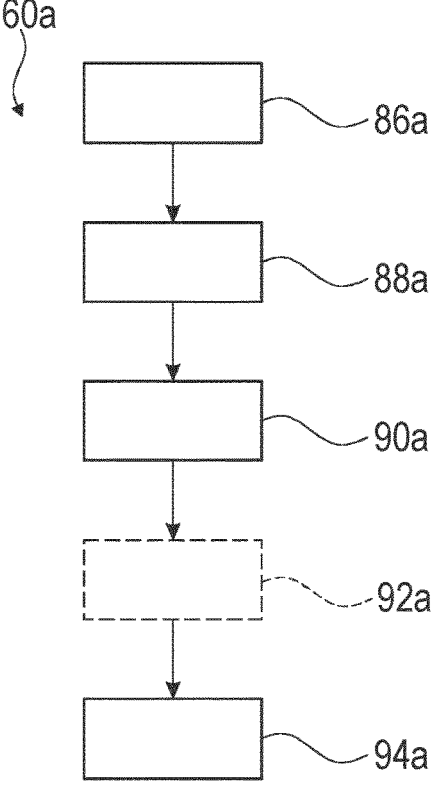
FIG. 4 shows a schematic method sequence of a method according to the invention for dividing the main product stream by means of the handling device according to the invention.

FIG. 4 shows a schematic method sequence of a method 60a for dividing the main product stream 12a, in particular into at least two partial product streams 14a. 16a, by means of the handling device 10a. In at least one method step 86a of the method 60a, the products 24a are conveyed along the main conveying direction 20a by means of the main stream transport unit 18a. In at least one method step 88a of the method 60a, a movement of the products 24a along the main conveying direction 20a on the division conveying element 28a is superimposed by a movement of the products 24a along the dividing conveying direction 26a as a function of a speed parameter of the division conveying unit 22a, in particular as a function of a conveyor belt speed of the division conveying element 28a. Preferably, the division conveying element 28a is driven in the direction of the dividing conveying direction 26a in the method step 88a by means of the division drive unit 70a. The main product stream 12a can advantageously be divided into the two partial product streams 14a. 16a as a result of the movement of the division conveying element 28a along the dividing conveying direction 26a. A dividing ratio of conveyed products 24a is preferably adjustable as a function of a speed or an acceleration of the division conveying element 28a. It is conceivable that all products 24a are conveyed to the further partial stream transport unit 42a, that some products 24a are conveyed to the further partial stream transport unit 42a and some products 24a are conveyed to the partial stream transport unit 40a, or that all products 24a are conveyed to the partial stream transport unit 40a.

When the division conveying element 28a is at a standstill, in particular in a motionless state, the products 24a of the main product stream 12a are transferred undivided from the division conveying element 28a to the partial stream transport unit 40a, in particular as a result of the products

24a sliding down the division conveying element 28a onto the partial stream transport unit 40a. In at least one method step 90a, due to a sliding friction between the division conveying element 28a, in particular the conveying surface 30a of the division conveying element 28a, and the products 24a, the products 24a are in a conveying-free state of the division conveying unit 22a conveyed along the main conveying direction 20a via the division conveying element 28a, in particular via the conveying surface 30a of the division conveying element 28a. In a driven state of the division conveying element 28a, the products 24a of the main product stream 12a are divided onto the partial stream transport unit 40a and the further partial stream transport unit 42a depending on a speed or an acceleration of the division conveying element 28a, wherein the main product stream 12a is divided into the partial product stream 14a along the partial stream transport unit 40a and into the further partial product stream 16a along the further partial stream transport unit 42a.

In at least one alternative or additional method step 92a of the method 60a, the division conveying element 28a is driven in an oscillating manner along the division conveying direction 26a, in particular in order to realize a buffer function. It is also conceivable that the buffer function is realized by means of the further division conveying unit in the product partial stream 14a and/or by means of the additional division conveying unit in the further product partial stream 16a in a method step of the method 60a. In at least one method step 94a of the method 60a, the products 24a are conveyed to the respective packaging devices 64a by means of the partial stream transport unit 40a and/or by means of the further partial stream transport unit 42a.

Figure 5:
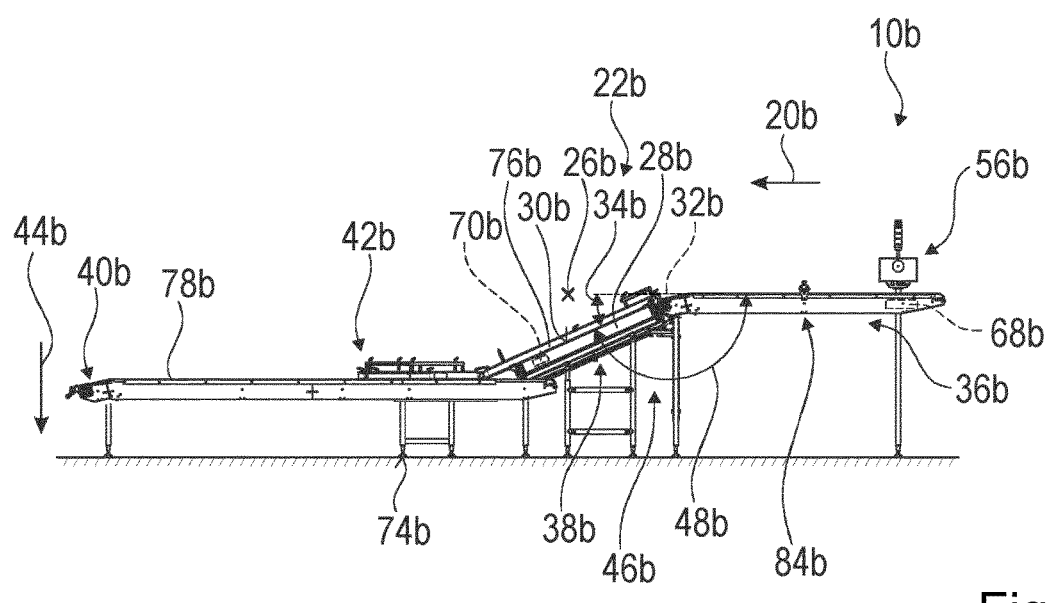
FIG. 5 shows a detailed view of an alternative handling device according to the invention in a schematic representation and FIG. 6 shows a further detailed view of the alternative handling device according to the invention in a schematic representation.
Figure 6:
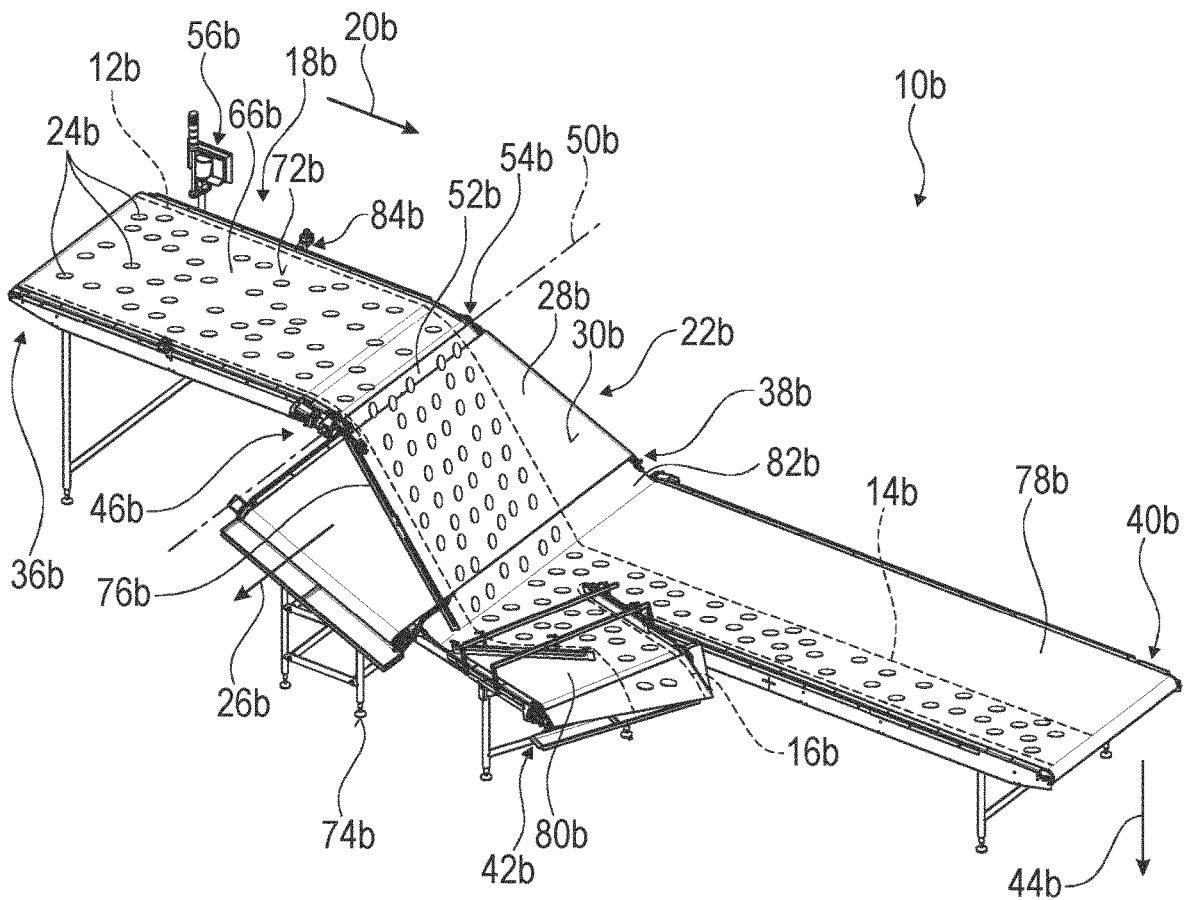

FIGS. 5 and 6 show a further embodiment example. The following description of FIGS. 5 and 6 and FIGS. 5 and 6 themselves are substantially limited to the differences between the embodiment examples, wherein reference can also be made in principle to the drawings and/or the description of the other embodiment example, in particular FIGS. 1 to 4, with regard to components with the same designation, in particular with regard to components with the same reference signs. In order to differentiate between the embodiment examples, the letter a is placed after the reference signs of the embodiment example in FIGS. 1 to 4. In the embodiment example in FIGS. 5 and 6, the letter a is replaced by the letter b.

FIGS. 5 and 6 show an alternative handling device 10b for dividing a main product stream 12b, in particular into at least two partial product streams 14b, 16b. The handling device 10b comprises at least one main stream transport unit 18b, in particular a main conveyor belt unit, by means of which the main product stream 12b can be conveyed along a main conveying direction 20b of the main stream transport unit 18b. Furthermore, the handling device 10b comprises at least one division conveying unit 22b, which is configured for dividing the main product stream 12b, in particular by discharging products 24b and/or by dividing the main product stream 12b into at least two partial product streams 14b, 16b, wherein the division conveying unit 22b comprises at least one division conveying element 28b, in particular a division conveyor belt, which is movable along a division conveying direction 26b of the division conveying unit 22b running transversely, in particular at least substantially perpendicularly, to the main conveying direction 20b and by means of which the main product stream 12b can be divided. The division conveying element 28b, in particular at least one conveying surface 30b of the division conveying element 28b, is arranged inclined relative to a main conveying plane 32b of the main stream transport unit 18b.

The handling device 10b preferably comprises at least one partial stream transport unit 40b, in particular a partial stream conveyor belt unit, by means of which one of the partial product streams 14b, 16b can be conveyed after the main product stream 12b has been divided into the at least two partial product streams 14b, 16b, and at least one further partial stream conveyor unit 42b, in particular a further partial stream conveyor belt unit, by means of which a further one of the partial product streams 14b, 16b can be conveyed after the main product stream 12b has been divided into the at least two partial product streams 14b, 16b. The partial stream transport unit 40b, in particular a product support surface of a partial stream transport element 78b of the partial stream transport unit 40b, and/or the further partial stream transport unit 42b, in particular a product support surface of the partial stream transport element 80b of the further partial stream transport unit 42b, are/is preferably, in particular in the embodiment example of the handling device 10b shown in FIGS. 5 and 6, orientated at least substantially parallel to a horizontal plane. With regard to further features of the handling device 10b and/or a method for dividing the main product stream 12b, in particular into at least two partial product streams 14b, 16b, by means of the handling device 10b, reference is made to the description of FIGS. 1 to 4, which should also be read analogously to FIGS. 5 and 6.

What is claimed is:

1. A handling device for dividing a main product stream (12a; 12b) comprising:

at least one main stream transport unit (18a; 18b) including a main conveyor belt unit by which the main product stream (12a; 12b) can be conveyed along a main conveying direction (20a; 20b) of the at least one main stream transport unit (18a; 18b), at least one division conveying unit (22a; 22b) which is configured for dividing the main product stream (12a; 12b), at least one partial stream transport unit (40a; 40b) which is embodied as a partial stream conveyor belt unit and by which, after the main product stream (12a; 12b) has been divided into at least two partial product streams (14a, 16a; 14b, 16b), one of the partial product streams (14a, 16a; 14b, 16b) can be conveyed, and at least one further partial stream transport unit (42a; 42b) which is embodied as a further partial stream conveyor belt unit and by which a further one of the partial product streams (14a, 16a; 14b, 16b) can be conveyed, wherein the at least one division conveying unit (22a; 22b) comprises at least one division conveying element (28a; 28b), which is movable along a division conveying direction (26a; 26b) of the at least one division conveying unit (22a; 22b), running at least substantially perpendicularly to the main conveying direction (20a; 20b), which includes a division conveyor belt by which the main product stream (12a; 12b) can be divided, wherein the at least one partial stream transport unit (40a; 40b) and/or the at least one further partial stream transport unit (42a; 42b) are/is arranged offset with respect to the at least one main stream transport unit (18a; 18b) along a direction (44a; 44b) that runs at least substantially perpendicularly to a main conveying plane (32a; 32b), wherein the at least one division conveying element (28a; 28b) is arranged inclined relative to the main conveying plane (32a; 32b) for a bridging of an offset between the at least one main stream transport unit (18a; 18b) and the at least one partial stream transport unit (40a; 40b) and/or between the at least one main stream transport unit (18a; 18b) and the at least one further partial stream transport unit (42a; 42b), wherein the at least one division conveying element (28a; 28b) is arranged inclined relative to the main conveying plane (32a; 32b) of the at least one main stream transport unit (18a; 18b), wherein a partial stream transport element (78a; 87b) of the partial stream transport unit (40a; 40b) adjoins the division conveying element (28a; 28b), wherein a partial stream transport element (80a; 80b) of the further partial stream transport unit (42a; 42b) adjoins the division conveying element (28a; 28b).

2. The handling device as claimed in claim 1, wherein an angle of inclination (34a; 34b) of the at least one division conveying element (28a; 28b) relative to the main conveying plane (32a; 32b) and/or relative to the main conveying direction (20a; 20b) has a value from a value range between 0° and 90°.

3. The handling device as claimed in claim 1, wherein the at least one division conveying element (28a; 28b) is configured as a division conveyor belt which can be driven in a circulatory manner around a guide unit (38a; 38b) of the at least one division conveying unit (22a; 22b), the guide unit (38a; 38b) being at least substantially stationary.

4. The handling device as claimed in claim 1, further comprising at least one adjusting unit (46a; 46b) for an adjustment of an angle of inclination (34a, 48a; 34b, 48b) of the at least one division conveying element (28a; 28b) relative to the main conveying plane (32a; 32b) and/or relative to the main conveying direction (20a; 20b).

5. The handling device as claimed in claim 1, further comprising at least one bridging unit (54a; 54b) at least for bridging or covering a gap between the at least one division conveying unit (22a; 22b) and the at least one main stream transport unit (18a; 18b).

6. The handling device as claimed in claim 1, further comprising at least one control or regulation unit (56a; 56b) for controlling or regulating the at least one division conveying unit (22a; 22b), wherein the at least one control or regulation unit (56a; 56b) is configured for a control or regulation of at least one speed parameter of the at least one division conveying unit (22a; 22b) for influencing the dividing of the main product stream (12a; 12b).

7. A production machine with at least one handling device as claimed in claim 1.

8. A method for dividing the main product stream (12a; 12b) by the handling device as claimed in claim 1, wherein as a function of a speed parameter of the at least one division conveying unit (22a; 22b) a movement of products (24a; 24b) along the main conveying direction (20a; 20b) on the at least one division conveying element (28a; 28b) is superimposed by a movement of the products (24a; 24b) along the dividing conveying direction (26a; 26b), wherein, in a driven state of the at least one division conveying element (28a; 28b), the products (24a; 24b) of the main product stream (12a; 12b) are divided onto the at least one partial stream transport unit (40a; 40b) and the at least one further partial stream transport unit (42a; 42b) depending on a speed or an acceleration of the at least one division conveying element (28a; 28b), wherein the main product stream (12a; 12b) is divided into a partial product stream (14a; 14b) along the at least one partial stream transport unit (40a; 40b) and into a further partial product stream (16*a*; 16*b*) along the at least one further partial stream transport unit (42*a*; 42*b*).

9. The method as claimed in claim 8, wherein due to a sliding friction between the at least one division conveying element (28*a*; 28*b* and the products (24*a*; 24*b*), the products (24*a*; 24*b*) are in a conveying-free state of the at least one division conveying unit (22*a*; 22*b*) conveyed along the main conveying direction (20*a*; 20*b*) via the at least one division conveying element (28*a*; 28*b*).

10. A method for dividing the main product stream (12*a*; 12*b*) by the handling device as claimed in claim 1, wherein due to a sliding friction between the at least one division conveying element (28*a*; 28*b*) and products (24*a*; 24*b*), the products (24*a*; 24*b*) are in a conveying-free state of the at least one division conveying unit (22*a*; 22*b*) conveyed along the main conveying direction (20*a*; 20*b*) via the at least one division conveying element (28*a*; 28*b*).

11. A handling device for dividing a main product stream (12*a*; 12*b*) comprising:

at least one main stream transport unit (18*a*; 18*b*) including a main conveyor belt unit by which the main product stream (12*a*; 12*b*) can be conveyed along a main conveying direction (20*a*; 20*b*) of the at least one main stream transport unit (18*a*; 18*b*), at least one division conveying unit (22*a*; 22*b*) which is configured for dividing the main product stream (12*a*; 12*b*), at least one partial stream transport unit (40*a*; 40*b*) by which, after the main product stream (12*a*; 12*b*) has been divided into at least two partial product streams (14*a*, 16*a*; 14*b*, 16*b*), one of the partial product streams (14*a*, 16*a*; 14*b*, 16*b*) can be conveyed, at least one further partial stream transport unit (42*a*; 42*b*) by which a further one of the partial product streams (14*a*, 16*a*; 14*b*, 16*b*) can be conveyed, and at least one adjusting unit (46*a*; 46*b*) for an adjustment of an angle of inclination (34*a*, 48*a*; 34*b*, 48*b*) of the at least one division conveying element (28*a*; 28*b*) relative to the main conveying plane (32*a*; 32*b*) and/or relative to the main conveying direction (20*a*; 20*b*), wherein the at least one division conveying unit (22*a*; 22*b*) comprises at least one division conveying element (28*a*; 28*b*), which is movable along a division conveying direction (26*a*; 26*b*) of the at least one division conveying unit (22*a*; 22*b*), running at least substantially perpendicularly to the main conveying direction (20*a*; 20*b*), wherein the at least one division conveying element (28*a*; 28*a*) is embodied as a division conveyor belt by which the main product stream (12*a*; 12*b*) can be divided, wherein the at least one partial stream transport unit (40*a*; 40*b*) and/or the at least one further partial stream transport unit (42*a*; 42*b*) are/is arranged offset with respect to the at least one main stream transport unit (18*a*; 18*b*) along a direction (44*a*; 44*b*) that runs at least substantially perpendicularly to a main conveying plane (32*a*; 32*b*), wherein the at least one division conveying element (28*a*; 28*b*) is arranged inclined relative to the main conveying plane (32*a*; 32*b*) for a bridging of an offset between the at least one main stream transport unit (18*a*; 18*b*) and the at least one partial stream transport unit (40*a*; 40*b*) and/or between the at least one main stream transport unit (18*a*; 18*b*) and the at least one further partial stream transport unit (42*a*; 42*b*), wherein the at least one division conveying element (28*a*; 28*b*) is arranged inclined relative to the main conveying plane (32*a*; 32*b*) of the at least one main stream transport unit (18*a*; 18*b*).

* * * * *